Feb. 23, 1937. A. J. WAYMAN 2,071,959
CLAMP
Filed Jan. 22, 1936

Inventor
Albert J. Wayman

By Frease and Bishop
Attorneys

Patented Feb. 23, 1937

2,071,959

UNITED STATES PATENT OFFICE 2,071,959

CLAMP

Albert J. Wayman, Youngstown, Ohio, assignor of one-half to Ernest H. McClure, East Palestine, Ohio Application January 22, 1936, Serial No. 60,271

6 Claims. (Cl. 173—273)

The invention relates generally to clamps for supporting a pipe and the like from a beam, and more particularly to a beam clamp which may be used to clamp a pipe to a beam, or to connect a ground wire to a pipe, or both.

Certain prior beam clamp constructions have provided means for clamping a pipe to a beam in a limited number of angular positions, but it is often desirable to clamp the pipe at an angle to the beam which is not provided for by such clamping means.

Moreover, it is frequently desirable to connect a ground wire to the pipe which is clamped to the beam, and prior constructions have required a separate ground connection or ground clamp in addition to the beam clamp.

Such prior ground connection constructions have usually included means for clamping the connection to the pipe and separate means for clamping the ground wire to the connection, with the result that the application of the connection to the pipe is an awkward operation consuming excessive time and trouble.

Accordingly, it is an object of the present invention to provide a novel clamp construction which will clamp a pipe to a beam in a plane substantially parallel to a longitudinal element thereof, and at any angle thereto.

Another object is to provide a novel clamp construction having single means for clamping a pipe to a beam and connecting a ground wire to the pipe.

A further object is to provide an improved pipe and beam clamp adapted to be used also as a ground clamp for connecting a ground wire to a pipe.

Another object is to provide an improved clamp construction which requires manipulation of only one means for clamping a pipe to a beam, or a ground wire to a pipe, or both.

A still further object is to provide an improved beam and ground clamp which will accommodate various sizes of pipes and various sizes of ground wires.

And finally, it is an object of the present invention to provide a novel and improved clamp construction embodying all of the foregoing objectives, which construction is simple and inexpensive to manufacture and which may easily be mounted or applied in any desired position with a minimum amount of time and trouble.

These and other objects are accomplished by the parts, movements and combinations comprising the present invention, and hereinafter described in detail and defined in the appended claims.

In general terms, the invention includes a C clamp having a clamping screw at one end and a pipe and ground wire engaging member swivelled in the other end.

Referring to the drawing forming part hereof,

Similar numerals refer to similar parts throughout the several views of the drawing.

Figure 1:
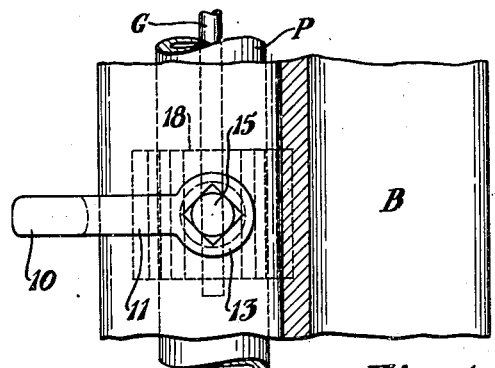
Figure 1 is a plan view of the improved clamp supporting a pipe from a beam and connecting a ground wire to the pipe, the pipe running in a direction parallel to the beam.

The improved clamp includes a body portion 10, which may be a one-piece casting generally C-shaped, having a head portion 11 at one end and a foot portion 12 at the other end.

The head portion 11 is preferably enlarged as shown at 13, and provided with a threaded hole 14, into which a bolt or set screw 15 is screwed, and the bolt provides means for engaging a support, or for moving the clamp into clamping relation with a pipe.

The other end 12 of the body portion 10 is provided with an enlarged portion 16 having a bore 17 therethrough, and the bore 17 is coaxial with the aperture 14 in the enlarged portion 13 of the head.

Figure 4:
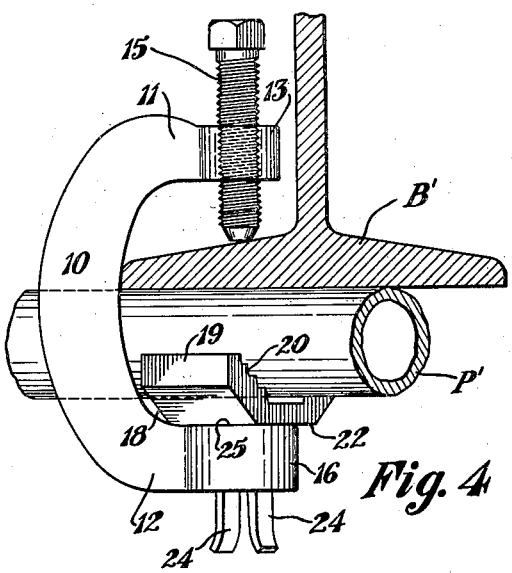
Fig. 4 is an elevation thereof showing the pipe and beam in section.

A jaw member or pipe-engaging member 18 is movably mounted in the foot portion, and includes the front or anterior jaw 19 having on its upper side serrations 20 for gripping a pipe and the like in a usual manner. The jaw member 18 is provided with a reduced rear or posterior portion 21, which may be swivelled in the bore 17 for movably mounting the jaw member in the foot 12. The reduced portion 21 forms a shoulder 22 on the jaw 19 for normally abutting the inner surface 25 of the enlarged portion 16, when the clamp is used merely to clamp a pipe to a beam, as shown in Fig. 4.

The reduced portion 21 of the jaw member is preferably slotted or bifurcated, as shown at 23, to form a fork having the prongs 24, and the ends of the prongs 24 may be spread apart slightly as shown, to prevent accidental removal of the jaw member from the bore 17 while allowing limited vertical movement of the jaw member therein. The slot 23 is adapted to receive a ground wire for making an electrical connection with the pipe which is clamped by the jaw member, if desired.

Figure 2:
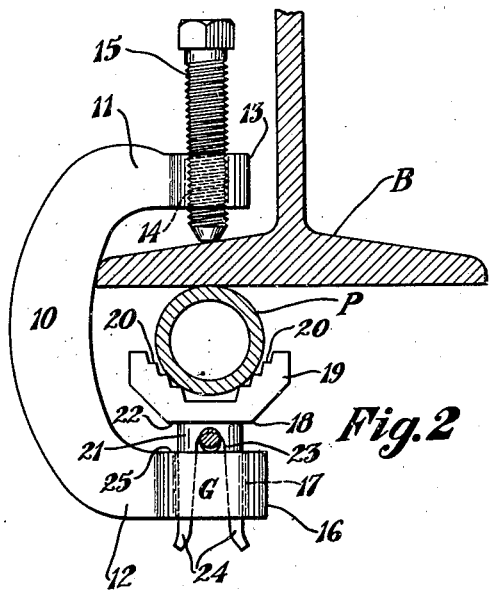
Fig. 2 is an elevation thereof, showing the pipe, beam and ground wire in section.

As shown in Figs. 1 and 2, the improved clamp may be used to support a pipe P from a beam B, and at the same time make an electrical connection between a ground wire G and the pipe P. By inserting the pipe P between the flange of the beam B and the jaw member 18, and inserting the ground wire G into the slot 23 of the jaw member 18, and then screwing downwardly on the bolt 15, the pipe P is clamped to the beam B and the jaw member 18 is forced toward the inner surface 25 of the enlarged portion 16 so as to clamp the ground wire between the shoulder 22 and the enlarged portion 16 of the body portion.

Thus, the manipulation of the means for clamping the pipe to the beam also clamps the ground wire between the jaw 19 and the portion 16 of the body. Preferably, the base or closed end of the slot 23 is provided with a slightly curved boss 26, as shown in Fig. 6, which serves to bend the ground wire when it is clamped against the enlarged portion 16 of the foot 12 to insure a good electrical connection.

Figure 3:
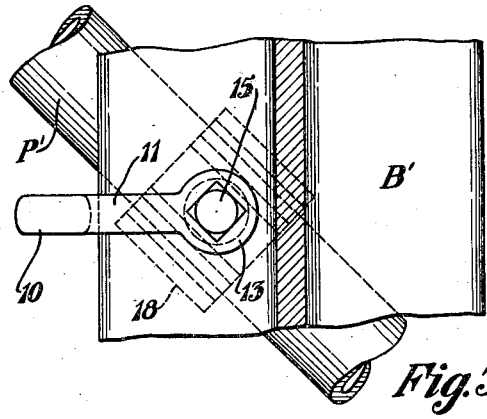
Fig. 3 is a plan view of the improved clamp supporting a pipe from a beam at an angle thereto.

As shown in Figs. 3 and 4, the improved clamp can be used merely as a beam clamp to support a pipe P' from a beam B' where the ground connection is not desired, in which case the shoulder 22 of the jaw 19 abuts the inner surface 25 of the enlarged portion 16, when the bolt 15 is screwed downwardly against the beam B'.

Figure 5:
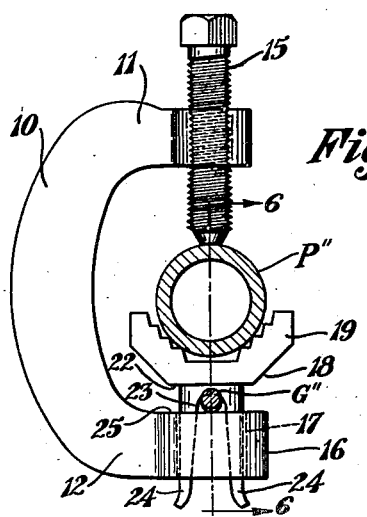
Fig. 5 is an elevation of the improved clamp applied to a pipe in a manner to connect a ground wire thereto.
Figure 6:
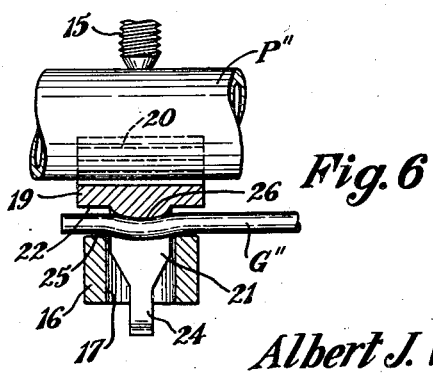
Fig. 6 is a fragmentary sectional view as on line 6—6, Fig. 5.

As shown in Figs. 5 and 6, the improved clamp may be used simply as a ground clamp where it is desired to make an electrical connection between a ground wire G" and a pipe P", in which case the bolt 15 is screwed downwardly to engage the top of the pipe P" and the jaw 19 clamps the ground wire G" against the enlarged portion 16 of the foot 12.

The improved clamp provides a simple and inexpensive construction, which may be used equally well as a beam clamp, or a ground clamp, or both simultaneously; and where it is used as both a beam and a ground clamp, the screwing of the bolt 15 serves to clamp the pipe to the beam and the ground wire to the pipe.

By swivelling the reduced portion 21 of the jaw member 18 in the bore 17 of the body portion, the jaw may be turned on its axis so as to clamp the pipe in the plane of a longitudinal element of the beam and at any angle thereto. In Figs. 1, and 2, the pipe is parallel with the beam, and in Figs. 3 and 4, it is shown at a decided angle thereto. Obviously, the pipe may be disposed transversely to the direction of the beam, or at any angle thereto, and still be securely clamped by the present improved clamp.

By making the bolt 15 and the bore 17 coaxial, the clamp is automatically maintained in line and neither the jaw nor the clamp as a whole tends to cock out of line when the bolt 15 is tightened.

The improved clamp is adapted to accommodate various sizes of pipes and/or ground wires, and is easily mounted or applied in desired position with a minimum amount of time and trouble.

I claim:—

1. A pipe clamp including a C-shaped body, a screw in one end of said body for engaging a support, a pipe jaw having a reduced shank provided with a wire-receiving slot, said shank being swiveled in the other end of said body, and said screw being adapted to clamp a pipe against said jaw and a ground wire in said slot and between said jaw and body.

2. A clamp including a body portion, means for clamping said body portion to a pipe, and a pipe-engaging member having a reduced shank provided with a slot for receiving a wire, said shank being movable in said body portion toward and away from said pipe, and said clamping means being adapted to clamp a ground wire in said slot and between the pipe-engaging member and the body portion.

3. A clamp including a body portion, movable means engaging said body portion for holding it in clamping relation with a pipe, and a pipe-seating member having a posterior slotted wire-receiving shank portion, said shank portion being movably mounted in said body portion for movement toward and away from said pipe.

4. A clamp including a body portion, movable means for holding said body portion in clamped relation with a pipe, and a pipe-seating member having a front jaw portion and a rear slotted wire-receiving portion, the slotted portion being movably mounted in said body portion for permitting movement of said member toward and away from said pipe, and said movable clamping means being adapted to clamp a ground wire in the slotted portion against the said body portion.

5. A clamp including a body portion, means at one end of said body portion for engaging a support, a jaw member mounted in the other end of said body portion for movement toward and away from said support engaging means, said jaw member having a shoulder for normally abutting the inner surface of said other end of the body and a reduced slotted wire-receiving portion swiveled in said other end, whereby the support engaging means selectively clamps a pipe to the support or a ground wire between the shoulder and body portion or both.

6. A pipe clamp including a body embracing a pipe, a pipe jaw having a shoulder forming a reduced posterior shank, said shank being mounted in the body for movement toward and away from the pipe and having a ground wire-receiving slot, and means for clamping said pipe jaw to said pipe and a wire in said slot between said shoulder and body.

ALBERT J. WAYMAN.